(12) United States Patent
Fraizer et al.

(10) Patent No.: US 12,466,962 B1
(45) Date of Patent: Nov. 11, 2025

(54) ILLUMINATED BODY PANELS INCLUDING OPTICS HAVING COATING WITH BUBBLES AND METHOD

(71) Applicant: Valeo Vision, Bobigny (FR)

(72) Inventors: Robert Fraizer, Auburn Hills, MI (US); Andrew Massey, Seymour, IN (US)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/932,060

(22) Filed: Oct. 30, 2024

(51) Int. Cl.
C09D 5/29 (2006.01)
F21V 3/10 (2018.01)

(52) U.S. Cl.
CPC . *C09D 5/29* (2013.01); *F21V 3/10* (2018.02)

(58) Field of Classification Search
CPC ........ F21V 3/063; F21V 3/049; F21V 3/0625; C09D 5/28; C09D 5/29
See application file for complete search history.

(56) References Cited

U.S. PATENT DOCUMENTS

| | | | | |
|---|---|---|---|---|
| 3,108,009 A * | 10/1963 | Clancy | ............ | D21H 19/70 106/155.21 |
| 3,637,431 A * | 1/1972 | Brenneman | ............ | B41M 5/124 428/321.1 |
| 3,720,827 A * | 3/1973 | Hemphill | ............ | F21V 3/04 359/707 |
| 5,272,001 A * | 12/1993 | Weisman | ............ | C08J 9/42 428/313.5 |
| 5,928,772 A * | 7/1999 | Shiraishi | ............ | B29C 44/1233 428/297.4 |
| 6,841,221 B2 * | 1/2005 | MacQueen | ............ | D06N 7/0052 525/227 |
| 7,327,415 B2 * | 2/2008 | Brickey | ............ | G02B 5/0242 349/112 |
| 7,569,257 B2 * | 8/2009 | Ha | ............ | G02B 5/0278 359/452 |
| 7,931,848 B2 * | 4/2011 | Ochi | ............ | C09D 169/00 427/331 |
| 8,287,158 B2 * | 10/2012 | Hwang | ............ | G02B 5/0278 362/330 |
| 8,750,671 B1 * | 6/2014 | Kelly | ............ | F21V 7/005 362/628 |
| 9,751,267 B2 * | 9/2017 | Tanaka | ............ | G02B 5/0231 |
| 2025/0146645 A1 * | 5/2025 | Van Delden et al. | .. | F21V 3/049 |

* cited by examiner

*Primary Examiner* — Ismael Negron
(74) *Attorney, Agent, or Firm* — Young Basile Hanlon & MacFarlane, P.C.

(57) ABSTRACT

An article of manufacture including a substrate and a coating including a colorant covering all or a portion of the substrate. The coating includes a plurality of bubbles that create material voids in the coating. The plurality of bubbles limit change in color by the colorant of any light transmitted through the article of manufacture. The article of manufacture is included in a panel to be installed in a vehicle. A method of manufacturing is also disclosed.

20 Claims, 7 Drawing Sheets

ILLUMINATED BODY PANELS INCLUDING OPTICS HAVING COATING WITH BUBBLES AND METHOD

TECHNICAL FIELD

This disclosure relates to parts of a vehicle that are illuminated and include a coating such as a paint or film that include bubbles to assist light in passing there through to illuminate the parts of a vehicle in a predetermined color.

BACKGROUND

Vehicles emit different types of light. Headlights, taillights, turn signal lights, fog lights, running lights, or any combination thereof, emit different intensities and colors of light. Additionally, vehicles may emit undercarriage lighting around the vehicle. Currently, what is needed are lights to provide decoration or decorative features on, in, or around all or a portion of vehicle.

SUMMARY

The present teachings provide for an article of manufacture including a substrate and a coating including a colorant covering all or a portion of the substrate. The coating includes a plurality of bubbles that create material voids in the coating. The plurality of bubbles limit change in color by the colorant of any light transmitted through the article of manufacture.

The present teachings provide for a lighting system including an article of manufacture including a first side, a second side, and a plurality of bubbles contained within the article of manufacture. A light source is positioned adjacent to the first side of the article of manufacture. The light source is positioned to direct light through the article of manufacture from the first side to the second side.

The present teachings provide for a method of manufacture including forming a substrate having a predetermined shape, covering all or a portion of the substrate with a coating, and adding a foaming agent or injecting a gas into the substrate, the coating, or both when the substrate, the coating, or both are being formed so that the substrate, the coating, or both includes a plurality of bubbles.

The substrate can have a refractive index greater than or equal to 1.25 and less than or equal to 1.75. The article can further include a light influencing layer containing a colorant. The light influencing layer can bias the color of the light to the color of the colorant of the light influencing layer. The light influencing layer can contain the plurality of bubbles. The material voids formed by the plurality of bubbles can form about 50 percent or more by volume. Each individual bubble of the plurality of bubbles can have a cross-sectional thickness of about 1 micrometer or less. The article of manufacture can include a clear coat layer covering all or a portion of the coating. The clear coat layer can fill any surface irregularities created by the plurality of bubbles in the coating. The article of manufacture can form part of a vehicle. The plurality of bubbles can be homogeneously distributed throughout. For example, the coating including bubbles may be applied to an article of manufacture as a paint, a film, or both so that the article of manufacture changes color, texture, appearance, or a combination thereof.

The second side of the article of manufacture can form part of an exterior surface of a vehicle. Alternatively, the second side of the article of manufacture can form part of an interior trim of a vehicle.

The method can include covering all or a portion of the coating with a clear coat. The manufacture of the method can be configured to be installed in a vehicle. The present teachings provide for an article of manufacture that emits unaltered or unsuppressed light. The plurality of bubbles can limit the change of the light transmitted through the article of manufacture. Decorative features, such as the article of manufacture can be illuminated and emit light of a different color than the exterior color of the article of manufacture.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
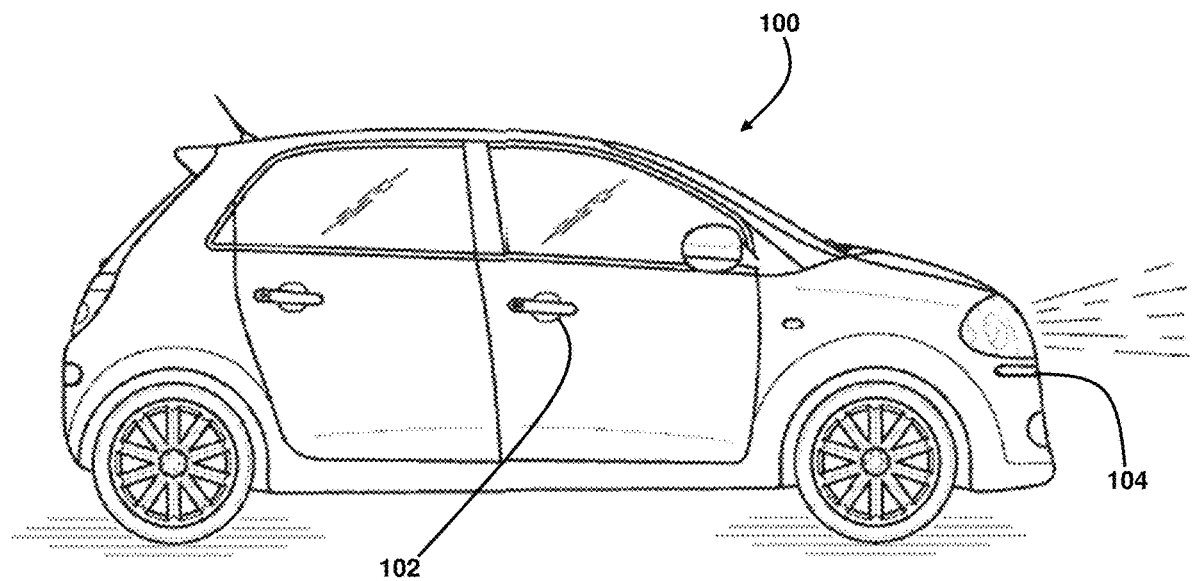
FIG. 1A is a side view of a vehicle including an article of manufacture.

The present teachings relate to an article of manufacture. The article can include a substrate and a coating covering all or a portion of the substrate. A plurality of bubbles can be located within the coating. The plurality of bubbles can limit change in color of any light transmitted through the article of manufacture. The coating can be applied to a substrate, disposed in a substrate, disposed on a substrate, mixed into a substrate, or a combination thereof to change an appearance of the substrate.

The substrate can be made of or include a polycarbonate (PC), vinyl, acrylic, polymethyl methacrylate (PMMA), polyethylene terephthalate (PET), amorphous copolyester (PETG), polyvinyl chloride (PVC), polyethylene (PE), ionomer resin, polypropylene (PP), fluorinated ethylene propylene (FEP), styrene methyl methacrylate (SMMA), styrene acrylonitrile resin (SAN), polystyrene, methyl methacrylate acrylonitrile butadiene styrene (MABS), or a combination thereof. The substrate can have some flexibility (e.g., may elastically deform 1-5 degrees) when contacted without breaking or plastically deforming. The substrate can allow light from the light source to pass through it. The substrate can be substantially transparent or completely transparent. For example, the substrate can have a refractive index greater than 1.20, greater than 1.30, or greater than 1.40. The substrate can have a refractive index less than 1.80, less than 1.70, or less than 1.60. The substrate can form any shape. The substrate can form a shape of a vehicle. The substrate can form decorative elements of a vehicle. For example, the substrate can form a part of a vehicle door, vehicle grille, or vehicle dash.

The substrate can directly hold and/or contact the coating thereon. The coating can cover all or a portion of the substrate. The coating can be applied directly to the substrate. The coating can be a layer, paint, film, or any combination thereof. The coating can let the light pass therethrough. The coating can limit the change in color of any light transmitted through the article of manufacture. The coating can be a different color than the color of the light that passes therethrough. For example, the coating can be green while the light may be white. Alternatively, the coating can change a wavelength of the light to change an appearance of the light. For example, the coating can color the light a predetermined color.

The coating can include a colorant that influences the color of the coating. For example, the colorant may influence the color of the coating to blue. The coating can be the exterior paint color of a vehicle. The coating can be a different color than the color of the light. The coating may not alter the color of the light as the light passes through. For example, coating can be blue while the color of the light before and after it passes through the coating can be white. Alternatively, the coating can be white while the color of the light before and after it passes through the coating can be blue. The coating can be applied directly to the substrate.

In certain examples, the article can also include a light influencing layer. The light influencing layer can be applied directly to the substrate. The light influencing layer can be a layer, paint, film, or combination thereof. The light influencing layer can include a colorant that influences the color of the light influencing layer. For example, the colorant can influence the color of the light influencing layer to white. The light influencing layer can bias the color of the light toward the color of the colorant of the light influencing layer. For example, where the light influencing layer is white, the light can pass through the light influencing layer and emit a white light after passing through. In examples where the light influencing layer is present and applied to the substrate, the coating can be applied directly to the light influencing layer, forming an exterior coating of the article of manufacture.

The colorant (e.g., colored materials) of the coating and the light influencing layer can be made of or include phosphorous, a photochromatic component, silicone phosphor, a chemiluminescence coating, zinc phosphate, chromium, zinc, vanadate, zirconium, manganese, iron, or a combination thereof. The colorant of the coating and the light influencing layer can include phosphor, a host material, and an activator. The coating and the light influencing layer can include copper zinc sulfide, titanium dioxide, silver zinc sulfides, oxides, nitrides, oxynitrides, sulfides, selenides, halides, silicates of zinc, cadmium, manganese, aluminum, silicon, a rare earth metal, nickel, or a combination thereof.

The plurality of bubbles can limit the change of color of any light transmitted through the article of manufacture. The plurality of bubbles can be contained within the substrate, the coating, or both. The plurality of bubbles can reduce the coloration of the light passed through the substrate and the coating. For example, the plurality of bubbles in a blue coating can reduce the coloration of a white light by the blue coating compared to a white light passed through a blue coating without the plurality of bubbles contained within. The plurality of bubbles can create material voids within the substrate, the coating, or both. The material voids can reduce the intersecting material of the substrate, the coating, or both. The reduced material intersection can allow the light to pass through the substrate, the coating, or both with less alteration compared to light passed through a substrate, a coating, or both, lacking the plurality of bubbles.

Preferably, the plurality of bubbles can be contained within the coating. The plurality of bubbles can reduce the amount of coating required by the light to pass through. The creation of material voids by the plurality of bubbles can limit the change in color of any light transmitted through the article of manufacture. In certain examples, the plurality of bubbles can be contained within the light influencing layer, the substrate, or both.

The plurality of bubbles can be distributed homogenously throughout the substrate, the coating, or both. For example, air can be metered into the coating during formation such that equal amounts of air are provided at locations that are equally spaced apart. If the coating begins as a liquid, a predetermined volume of air can be provided into a container containing the liquid and then the liquid may be mixed (e.g., shaken, stirred, agitated) until the air is substantially equally distributed throughout.

Alternatively, the plurality of bubbles can be distributed non-homogenously throughout the substrate, the coating, or both. The plurality of bubbles can be distributed homogenously or non-homogenously by size, volume, or both. For example, the plurality of bubbles can be homogenously or non-homogenously distributed by size, where the plurality of bubbles are substantially all the same size or substantially different sizes (substantially as used herein means that greater than 90 percent of the referenced parameter meets the defined criteria). Alternatively, the plurality of bubbles can be homogenously or non-homogenously distributed by volume, where the plurality of bubbles form some or all of the substrate, the coating, or both. Homogenous can be defined to describe an even or similar distribution of the plurality of bubbles. Non-homogenous can be defined to describe an uneven or randomized distribution of the plurality of bubbles.

The plurality of bubbles can be spaced apart throughout the substrate, the coating, or both. The plurality of bubbles can be homogenously spaced apart throughout the substrate, the coating, or both. For example, the individual bubbles of the plurality of bubbles can each be spaced the same distance apart from each other. Alternatively, the plurality of bubbles can be non-homogenously spaced throughout the substrate, the coating, or both. For example, the individual bubbles of the plurality of bubbles may be spaced random, uneven distances apart from each other.

The plurality of bubbles non-homogenously distributed by volume, size, or spacing, can appear to the naked eye to be homogenously distributed by volume, size, or spacing. For example, there may be a sufficient amount of bubbles in the plurality of bubbles so that even if the bubbles are not homogenously distributed, the appearance of the light extending from the article of manufacture can appear homogenous.

The material voids created by the plurality of bubbles can form an amount of the substrate, the coating, or both. The material voids can reduce the amount of material required by the light to pass through. For example, the voids can form about 10 percent or more, about 20 percent or more, about 30 percent or more, or about 40 percent or more of the total volume of the substrate, the coating, or both (e.g., ±2 percent or less or ±1 percent or less). The voids can form about 90 percent or less, about 80 percent or less, about 70 percent or less, about 60 percent or less, or about 55 percent or less (e.g., about 50 percent) by volume.

The plurality of bubbles can be microbubbles. The plurality of bubbles may not be viewable by the naked eye. For example, a viewer of the article may not be able to view the plurality of bubbles without the use of additional viewing technology, such as a microscope or a magnifier. Each individual bubble of the plurality of bubbles can have a cross-sectional thickness of about 0.25 micrometer or more, about 0.5 micrometer or more, or about 0.75 micrometer or more. Each individual bubble of the plurality of bubbles can have a cross-sectional thickness of about 1.75 micrometer or less, about 1.5 micrometer or less, or about 1.25 micrometer or less. Each individual bubble of the plurality of bubbles can have a cross-sectional thickness of about 1 micrometer or less. The cross-sectional thickness of each individual bubble can be the largest distance across the void created by the bubble. For example, if the void is oval shaped, the cross-sectional thickness would be the major diameter. Alternatively, the cross-sectional thickness can be a diameter of a sphere, depending on the shape of the bubble.

A clear coat layer can be added to the exterior of the coating. The clear coat layer can be applied when the plurality of bubbles is contained within the coating. The cleat coat layer can cover all or a portion of the coating. The clear coat layer can be applied directly to the coating. The clear coat layer can fill in any surface irregularities created by the plurality of bubbles in the coating. The clear coat layer can be an acrylic or a silicone. Alternatively, the clear coat layer can be a polyurethane. For example, the clear coat layer can be acrylic-urethane or acrylic paint chemistries.

The article of manufacture can be part of a vehicle. The article of manufacture can be a grille, a door handle, a bumper, a fender, a quarter panel, facia, a component made of plastic, or a combination thereof. The article of manufacture can be a movable component, a static component, or both. The article of manufacture can be located on the outside of the vehicle. Alternatively, the article of manufacture can be located within the vehicle. Preferably, the article of manufacture can be part of a vehicle such as a car, motorcycle, bus, truck, semi-truck, SUV, XUV, four-wheeler, dirt bike, tractor, combine, heavy equipment, farm equipment, industrial equipment, commercial equipment, or a combination thereof. Preferably, the article of manufacture can emit a light.

The article of manufacture can be illuminated by a lighting system. The lighting system can be connected to the vehicle and illuminate a region within or surrounding the vehicle. The lighting system can provide light, decoration, notice, message, or a combination thereof. The lighting system can project light outward in a predetermined pattern or shape of any desire. The lighting system can provide light when the vehicle is not moving. For example, the lighting system can operate when the doors are locked, the doors are unlocked, the vehicle is in park, the vehicle is not moving, or a combination thereof.

The lighting system can include a light source. The light source can direct light through the article of manufacture. The light source can provide light that may be entirely decorative. The light source can be any type of lighting device that produces light such as an incandescent bulb, fluorescent light, compact fluorescent lamp, halogen lamp, light emitting diode (LED), high intensity discharge lamps (HID), halogen lights, xenon lights, a laser diode, phosphorous bulb, or a combination thereof. The light source can be a single lamp or bulb. The number of light sources in a part of the light can depend upon a size of the region or a size illuminated. Thus, the light source can be one or more lights, two or more lights, or three or more lights. The light source can be static. The light source can be free of movement. The light source can be fixed. The light source can be static and can be manually or physically adjusted so that the light source is directed to a desired location. Each device (e.g., light or LED) of the light source can be turned on and off. The light source can be illuminated in a sequence. The light source can be located within the light system at a location relative to the substrate, an edge of the substrate, a side of the substrate, or a combination thereof. Multiple light sources can work together as a set of light sources to create light. All of the light sources can be a same color or provide a same color light. For example, all of the lights can be white or non-colored light. Alternatively, all of the lights can be a non-white-colored light. Preferably, all of the light sources can be a single-color light source.

The light source can emit a light of any color. The light source can be tuned to a specific color to reduce pigmentation and limit change in color of the light through the article of manufacture. The light source can be tuned a specific color opposite the colorant of the coating. For example, the light source can emit the color green while the colorant of the coating can be the color red. The light source can direct light through a first side of the article of manufacture to a second side of the article of manufacture. The light source can be positioned adjacent to the first side of the article of manufacture. The light source can emit light that travels through the article of manufacture. The light source can project light of a first color into the article of manufacture and the light can emerge from the article of manufacture the same color as the first color. For example, the light projected by the light source can be white, while the colorant of the coating of the article of manufacture can be blue. Accordingly, the light emitted from the article of manufacture can be white. The first side of the article of manufacture can be an interior of a vehicle. For example, the light source can be positioned adjacent to the interior or within a vehicle door. The second side of the article of manufacture can be the exterior of a vehicle. For example, the second side can be the exterior paneling of the vehicle, such as the door or the grille. Alternatively, the second side can be an interior trim of a vehicle. For example, the light source can be positioned within the dash of the vehicle such that when illuminated, light is projected through the dash and the interior trim of the vehicle.

The article of manufacture can be made by one or more of the steps taught herein. The process can begin by optionally adding a foaming agent or injecting gas into a substrate when forming the substrate. The substrate can be shaped to a predetermined shape. The predetermined shape can form a part of a vehicle, such as a door, the grille, or an interior trim of the vehicle. The substrate can be covered by the coating. The coating can be fluid or solid before being applied. The coating can be a sheet or a film that may be adhered to the substrate. The coating can be a liquid that may be deposited on the substrate. The colorant (e.g., colored materials) can be added to the coating. The coating can be deposited by spraying, painting, rolling, atomizing, airless spraying, electrostatic application, dipping, brushing, or a combination thereof. The coating can be applied on one or more sides of the substrate. The coating can be applied to a single side of the substrate. The coating can be dried after being applied. Heat can be applied to the coating to dry the coating. The coating can be dried by ambient conditions. The coating can be applied to a substrate that is free of the light source. The coating can coat all or a portion of the substrate. A mask can be applied to the substrate. The coating can be applied without a mask being present. The coating can be applied and then a portion of the coating can be removed. The coating can be removed to generate a pattern, a shape, a word, an image, any other shape herein, or a combination thereof.

Alternatively, the substrate can be first covered by the light influencing layer. The light influencing layer can then be covered by the coating. The light influencing layer can be fluid or solid before being applied. The light influencing layer can be a sheet or a film that may be adhered to the substrate. The light influencing layer can be a liquid that may be deposited on the substrate. The colorant (e.g., colored materials) can be added to the light influencing layer. The light influencing layer can be deposited by spraying, painting, rolling, atomizing, airless spraying, electrostatic application, dipping, brushing, or a combination thereof. The light influencing layer can be applied on one or more sides of the substrate. The light influencing layer can be applied to a single side of the substrate. The light influencing layer can be dried after being applied. Heat can be applied to the light influencing layer to dry the light influencing layer. The light influencing layer can be dried by ambient conditions. The light influencing layer can be applied to a substrate that is free of the light source. The light influencing layer can coat all or a portion of the substrate. A mask can be applied to the substrate. The light influencing layer can be applied without a mask being present. The light influencing layer can be applied and then a portion of the light influencing layer can be removed. The light influencing layer can be removed to generate a pattern, a shape, a word, an image, any other shape herein, or a combination thereof.

The plurality of bubbles can be added to the substrate, the coating, or both. The plurality of bubbles can be introduced when the substrate, the coating, or both are being formed. For example, the plurality of bubbles can be introduced into the coating before the coating dries onto the substrate.

The plurality of bubbles can be introduced in the coating by a solvent. The solvent can be any solvent that volatizes or expands during curing of the coating. The expansion of the solvent can create the plurality of bubbles. Changing an amount of the solvent or the type of solvent can alter the size and number of the plurality of bubbles, thereby impacting homogeneity.

Alternatively, the plurality of bubbles can be introduced in the substrate, the coating, or both by a foaming agent. The foaming agent can be any chemical which causes the substrate, the coating, or both to form a plurality of bubbles within with the properties described herein. The foaming agent can be introduced in an in-mold process. For example, the foaming agent can create the plurality of bubbles in the substrate, the coating, or both while contained within a cavity. The foaming agent can release carbon dioxide during mixing to create the plurality of bubbles within the substrate, the coating, or both. The foaming agent can be a mixture of polyether polyol and poly-isocyanate. Additionally, physical blowing agents can be introduced with the foaming agent. The physical blowing agents can further increase the plurality of bubbles created by the foaming agent. The physical blowing agents can be low boiling liquids that undergo evaporation (e.g., pentane).

The plurality of bubbles can be introduced in the substrate, the coating, or both by gas injection. The plurality of bubbles can be introduced by in-mold gas injection. The substrate, the coating, or both can be aerated by nitrogen, carbon dioxide, or any other suitable gas before injection into a cavity to cure. For example, an aeration device can introduce nitrogen gas into the coating in the liquid phase. The coating can then be injected into the cavity to cure.

FIG. 1A illustrates a side view of a vehicle 100. Part of the exterior of the vehicle 100 can be formed of the article of manufacture disclosed here within. For example, a door handle 102 and/or a grille 104 can be formed of the article of manufacture. Alternatively, part of the interior of the vehicle 100 can be formed of the article of manufacture (e.g., a shifting knob).

Figure 1B:
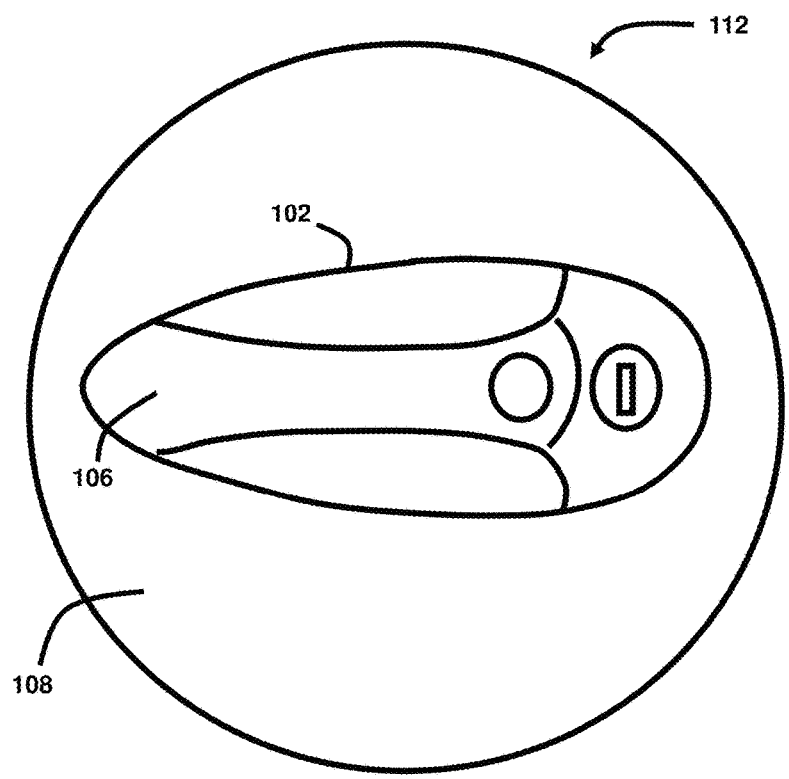
FIG. 1B is a close view of a door handle of the vehicle including the article of manufacture.

FIG. 1B illustrates a close view of a door handle area 112. The door handle area 112 can include the door handle 102, a surrounding vehicle color 108 of the vehicle 100 and a pre-illumination color 106 of the door handle 102. The pre-illumination color 106 and the surrounding vehicle color 108 can be the same color pre-illumination of a light source.

Figure 1C:
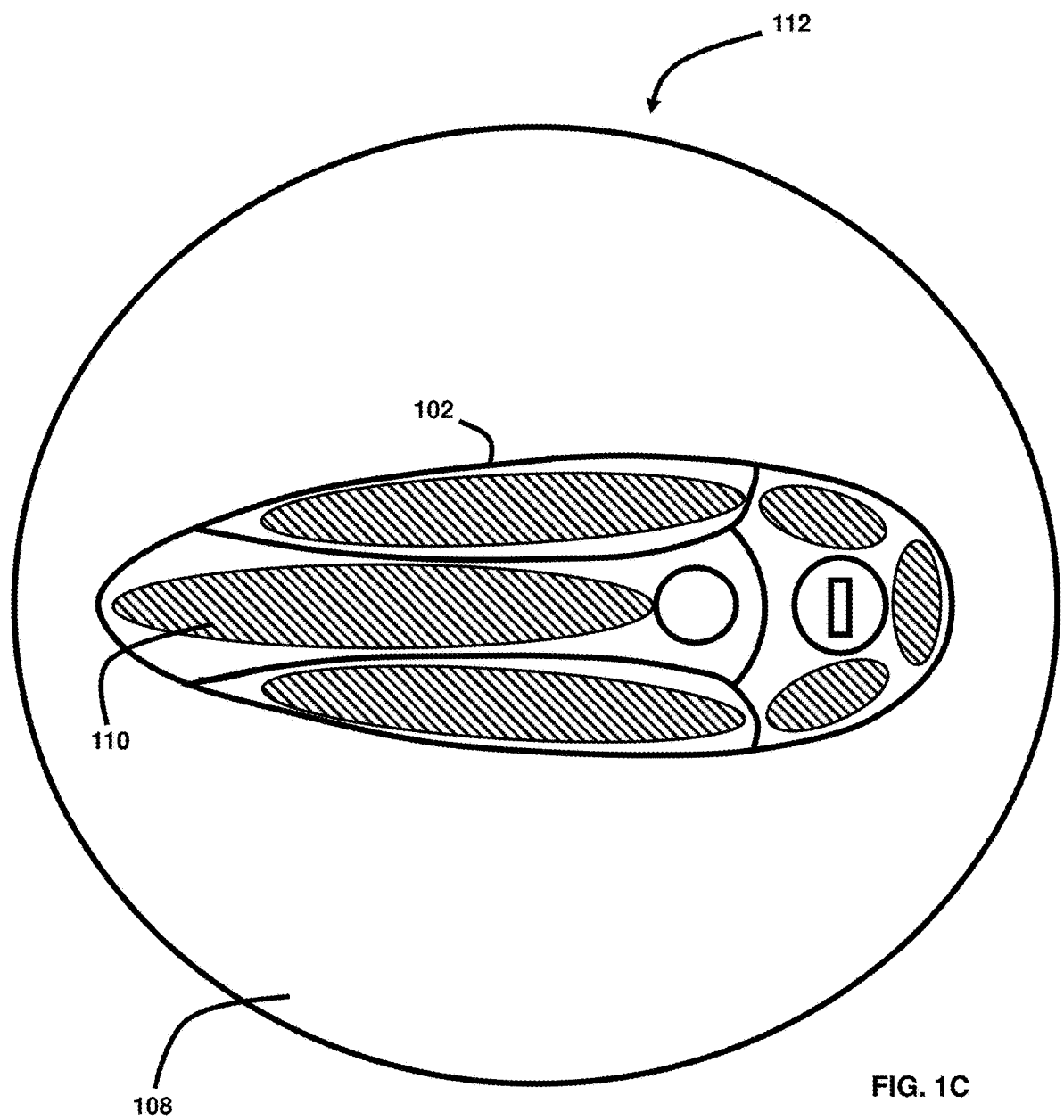
FIG. 1C illustrates the close view of the door handle where the door handle including the article of manufacture is illuminated by a lighting system.

FIG. 1C illustrates the effect of illuminating a light source behind the door handle 102. After illumination of the light source, a post-illumination color 110 may be emitted. The post-illumination color 110 can be different than the surrounding vehicle color 108, thereby making the door handle 102 a different color than the rest of the vehicle 100 when the light source is illuminated behind the door handle 102. For example, the pre-illumination color 106 of the door handle 102 and the surrounding vehicle color 108 can both be green, pre-illumination. Post-illumination, the surrounding vehicle color 108 can still be green, however the post-illumination color 110 of the door handle 102 can be white, or such similar color to the light source.

Figure 2:
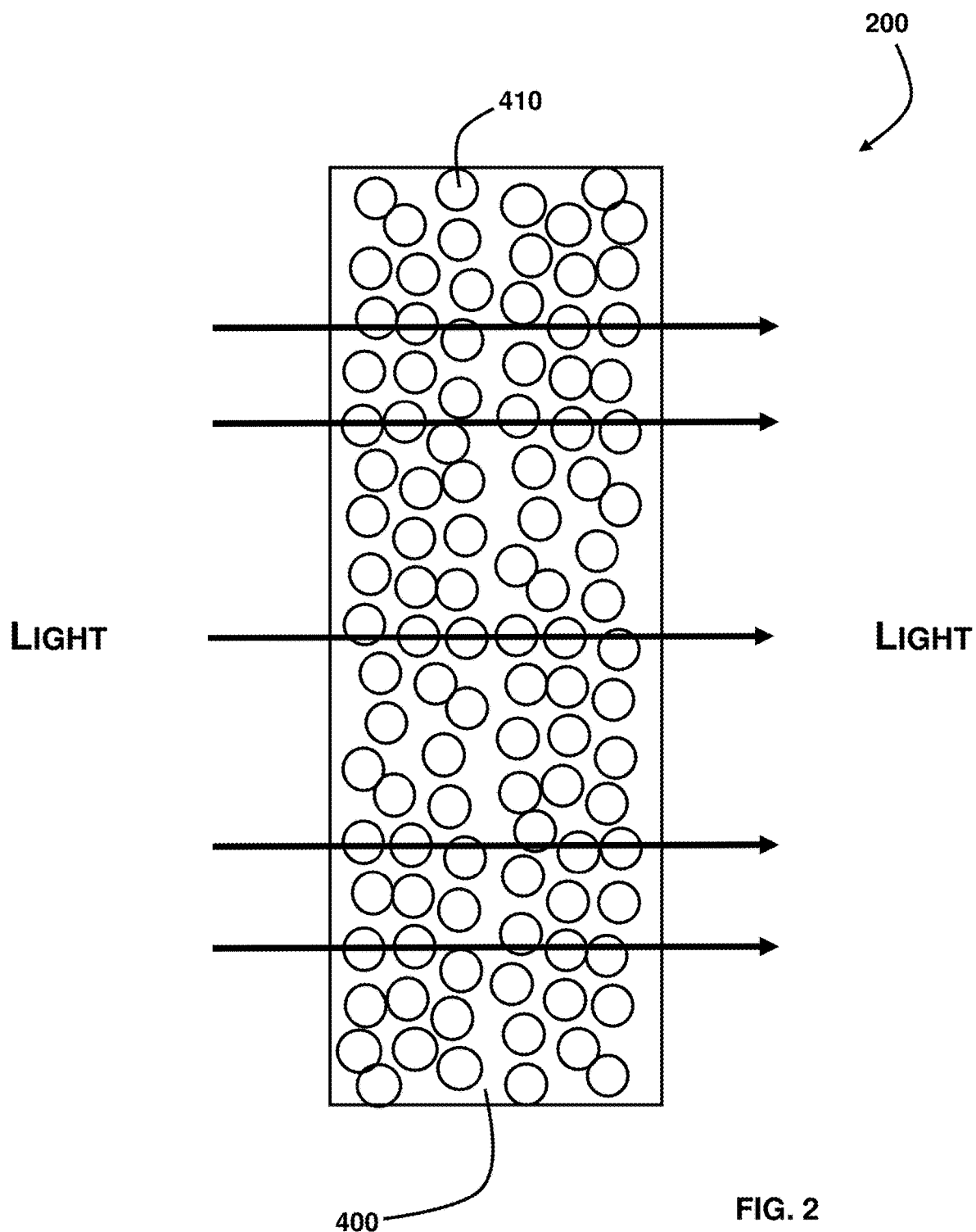
FIG. 2 illustrates a cross-sectional view of light traveling through bubbles of the article of manufacture.

FIG. 2 illustrates the lighting system 200. A light emitted by the light source can travel through the plurality of bubbles 410 in the article of manufacture 400. The article of manufacture 400 can be a different color than the color of the light emitted by the light source. The plurality of bubbles 410 can reduce the amount of material required to be traveled through by the light. By reducing the amount of material, the plurality of bubbles can help prevent the light from taking on the color of the article of manufacture. As shown in FIG. 2, the light may travel through individual bubbles of the plurality of bubbles 410 to limit change in color of the light.

Figure 3:
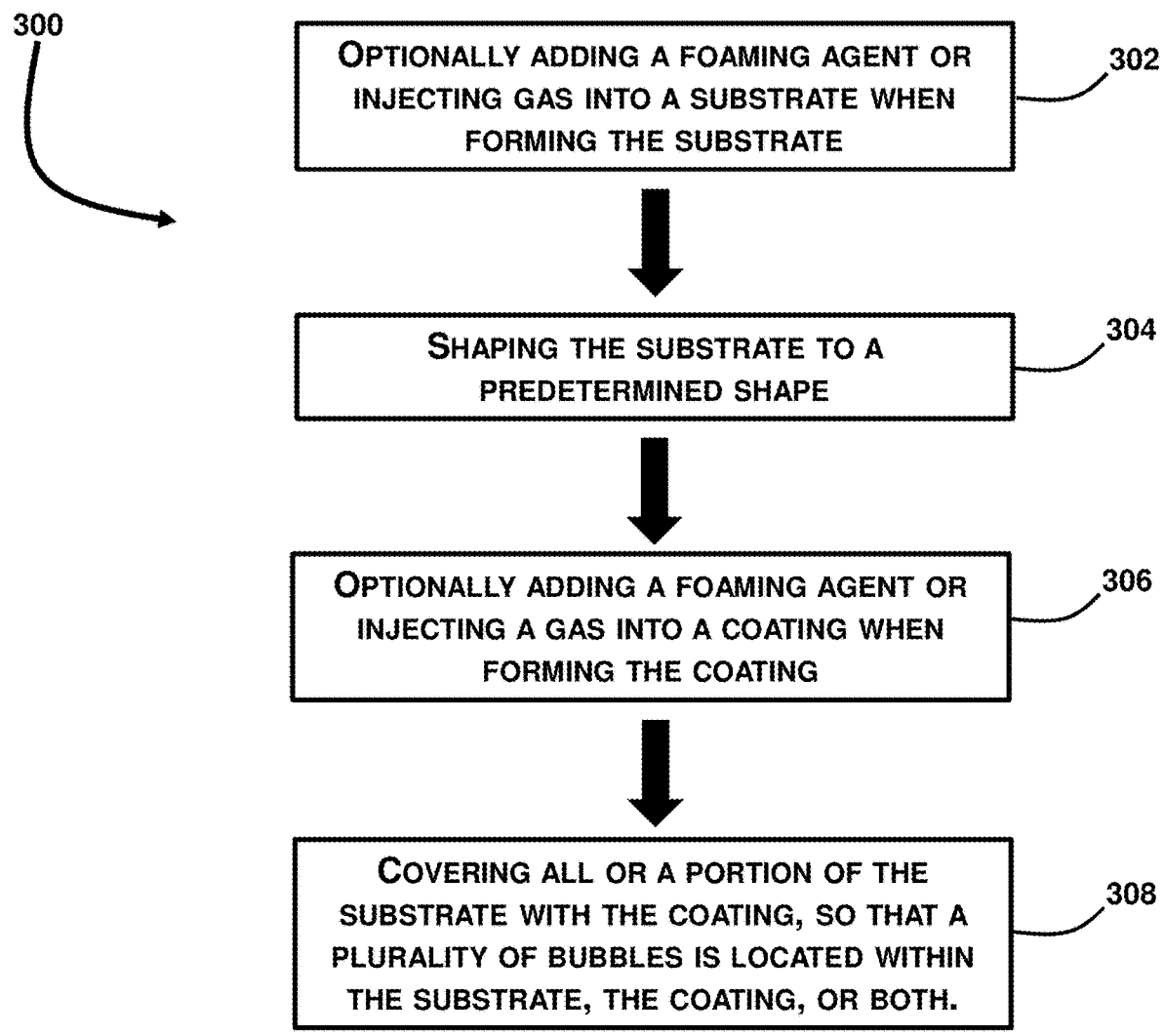
FIG. 3 illustrates a schematic describing the method of making the article of manufacture.

FIG. 3 illustrates a method 300 for making the article of manufacture 400. The method begins with optionally adding 302 a foaming agent or injecting gas into a substrate when forming the substrate. The substrate is shaped 304 to a predetermined shape. A foaming agent is added or a gas is injected 306 into a coating. All or a portion of the substrate is covered 308 with the coating so that a plurality of bubbles is located within the substrate, the coating, or both.

Figure 4:
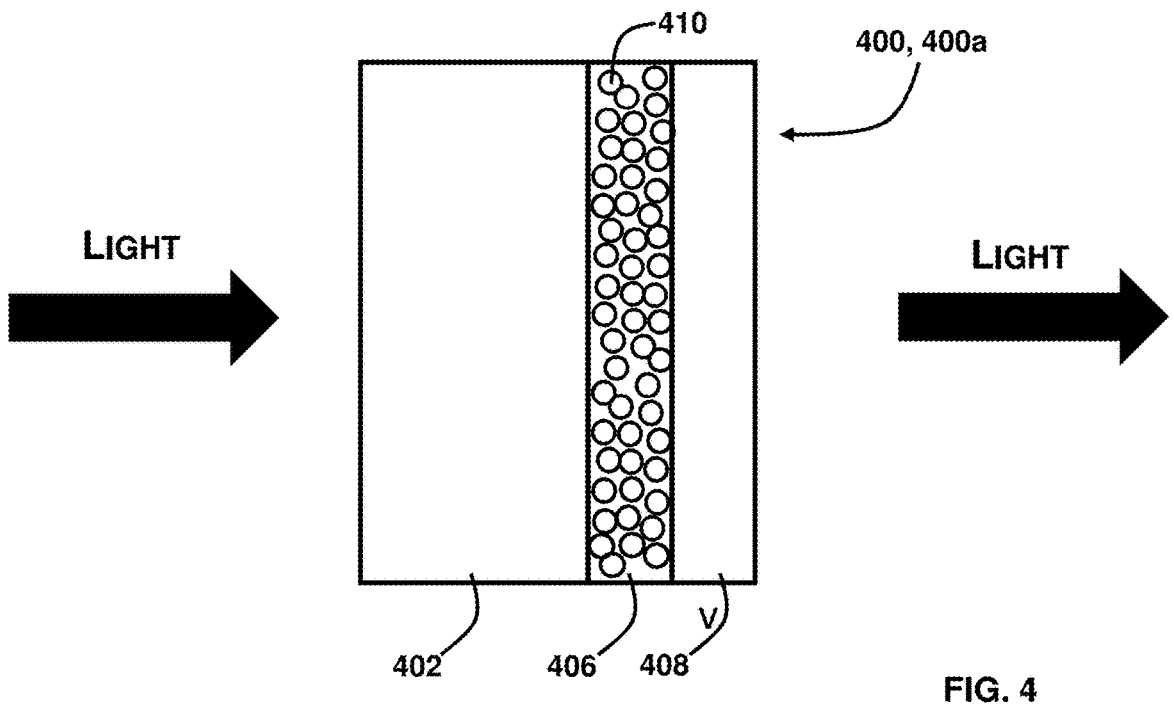
FIG. 4 illustrates a cross-sectional view of the article of manufacture.

FIG. 4 illustrates a cross-sectional view of the article of manufacture 400 with a layout 400a comprising the substrate 402, the coating 406, and the clear coat 408. The plurality of bubbles 410 can be present in the coating 406, as shown. Alternatively, the plurality of bubbles 410 can be present in the substrate 402, or both. The plurality of bubbles 410 is homogenously distributed in size, volume, and space, as described herein. Alternatively, the plurality of bubbles 410 can be non-homogenously distributed in size, volume, and/or space.

Figure 5:
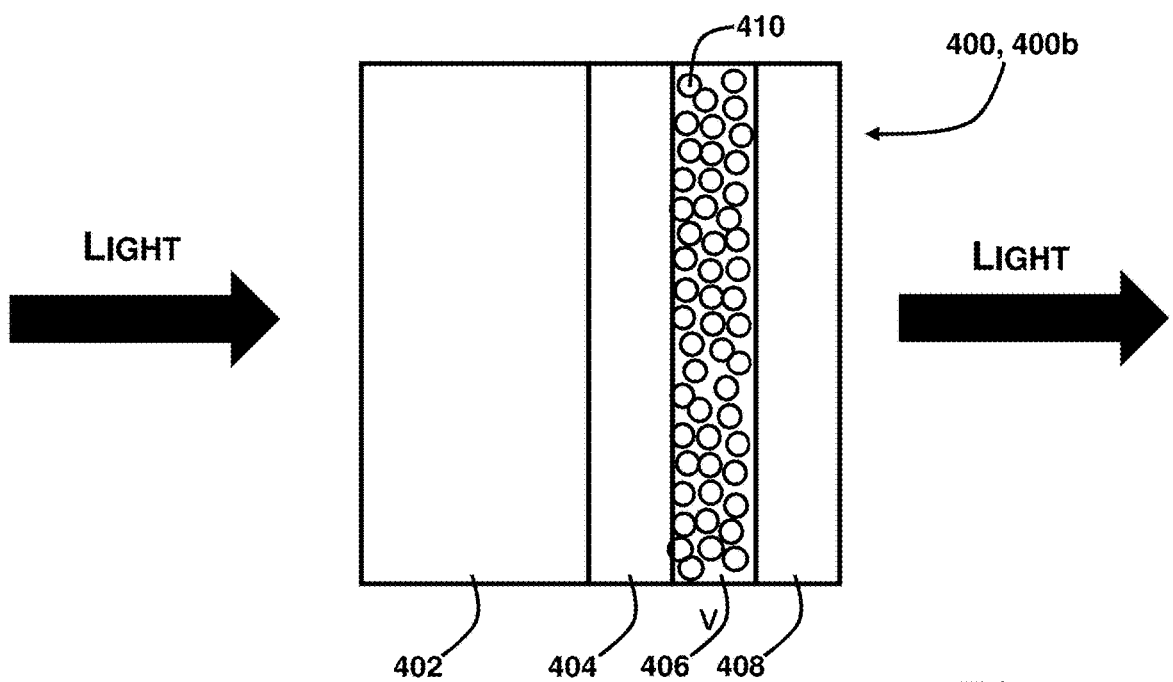
FIG. 5 illustrates a cross-sectional view of the article of manufacture.

FIG. 5 illustrates a cross-sectional view of the article of manufacture 400 with a layout 400b comprising the substrate 402, the light influencing layer 404, the coating 406, and the clear coat 408. As shown in FIG. 4, the plurality of bubbles 410 can be present in the coating 406. Alternatively, the plurality of bubbles 410 can be present in the substrate 402, the light influencing layer 404, or both. The plurality of bubbles 410 is homogenously distributed in size, volume, and space, as described herein. Alternatively, the plurality of bubbles 410 can be non-homogenously distributed in size, volume, and/or space.

Figure 6:
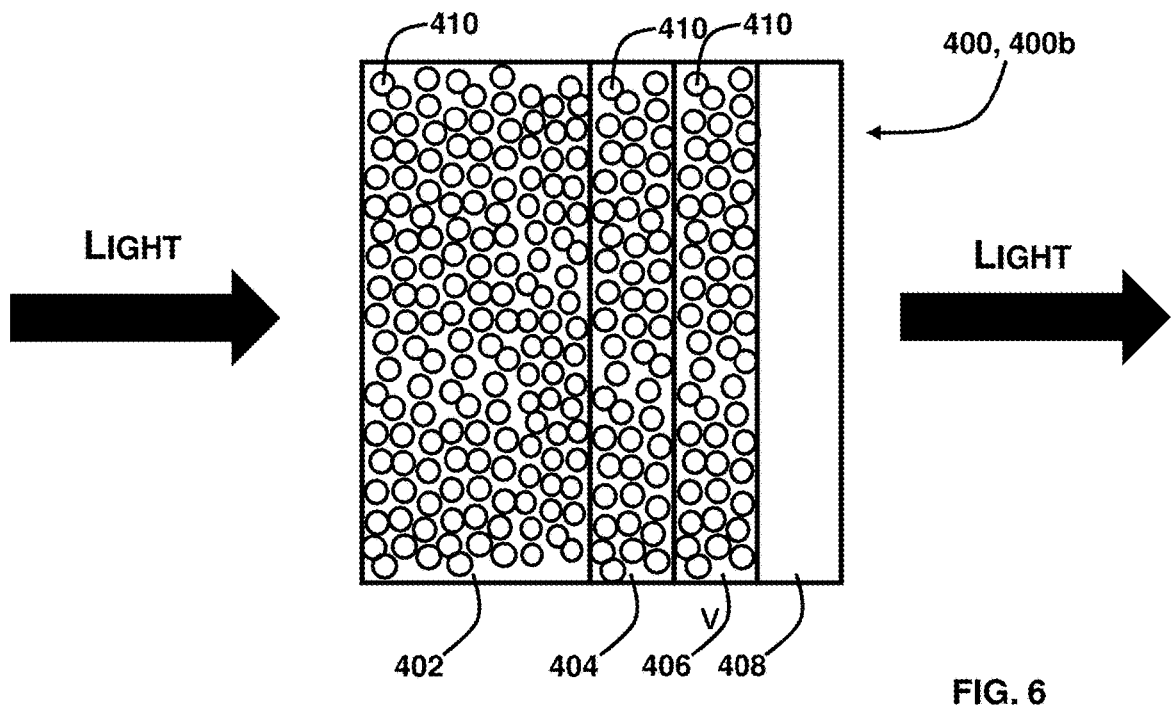
FIG. 6 illustrates a cross-sectional view of the article of manufacture.

FIG. 6 illustrates a cross-sectional view of the article of manufacture 400 with the layout 400b. As shown in FIG. 6, the plurality of bubbles 410 is present in the substrate 402, the light influencing layer 404, and the coating 406. The plurality of bubbles 410 is homogenously distributed in size, volume, and space, as described herein. Alternatively, the plurality of bubbles 410 can be non-homogenously distributed in size, volume, and/or space.

Figure 7:
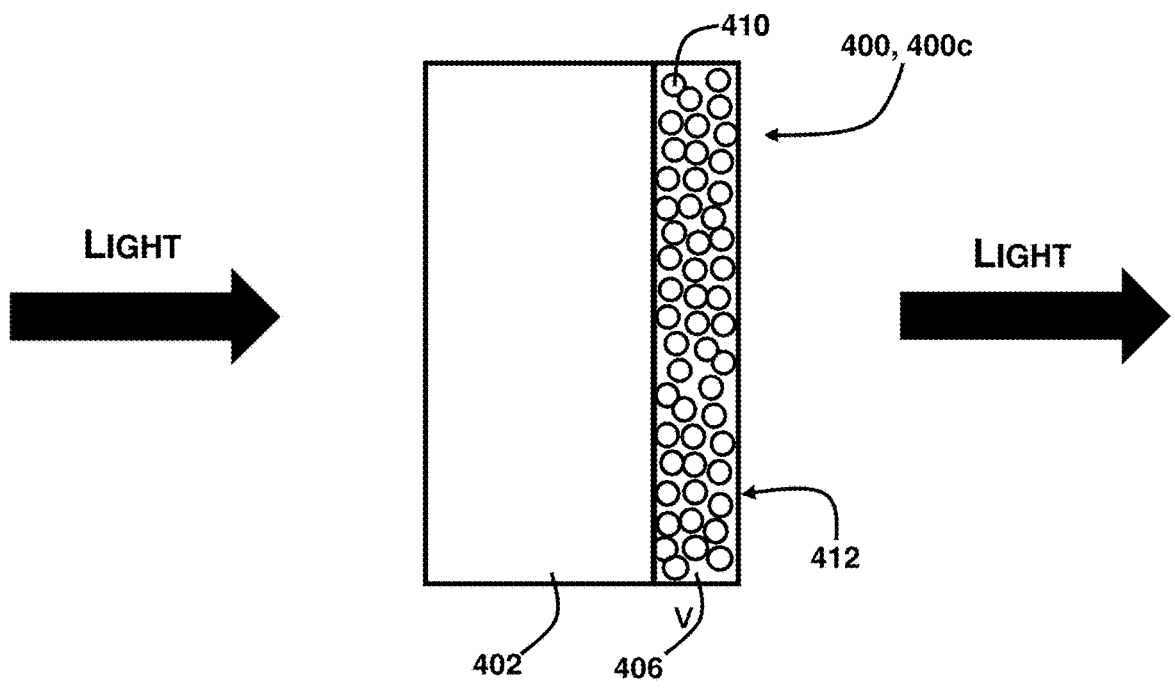
FIG. 7 illustrates a cross-sectional view of the article of manufacture.

FIG. 7 illustrates a cross-sectional view of the article of manufacture 400 with a layout 400c comprising the substrate 402, the coating 406, and a molded surface 412. The plurality of bubbles 410 can be present in the coating 406, as shown. Alternatively, the plurality of bubbles 410 can be present in the substrate 402, or both. The plurality of bubbles 410 is homogenously distributed in size, volume, and space, as described herein. Alternatively, the plurality of bubbles 410 can be non-homogenously distributed in size, volume, and/or space.

Figure 8:
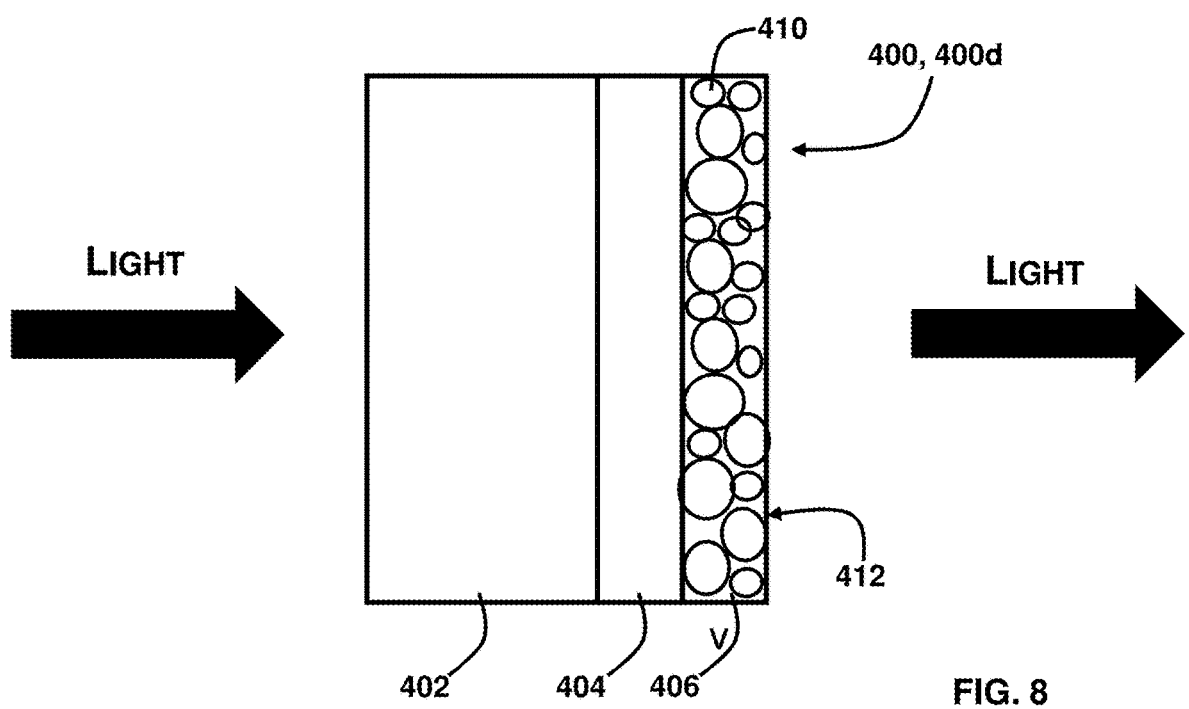
FIG. 8 illustrates a cross-sectional view of the article of manufacture.

FIG. 8 illustrates a cross-sectional view of the article of manufacture 400 with a layout 400d comprising the substrate 402, the light influencing layer 404, the coating 406, and the molded surface 412. The plurality of bubbles 410 can be present in the coating 406, as shown, but can be present in the substrate 402, the light influencing layer 404, or both. The plurality of bubbles 410 is non-homogenously distributed in size, volume, and space, as described herein. Alternatively, the plurality of bubbles 410 can be homogenously distributed in size, volume, and/or space.

ELEMENT LIST

100 Vehicle
102 Door Handle
104 Grille
106 Pre-Illumination Color
108 Surrounding Vehicle Color
110 Post-Illumination Color
112 Door Handle Area
200 Lighting System
400 Article of Manufacture
410 Plurality of Bubbles
300 Method of Manufacture
302 Optionally Adding a Foaming Agent or Injecting Gas When Forming a Substrate
304 Shaping the Substrate
306 Optionally Adding a Foaming Agent or Injecting a Gas When Forming a Coating
308 Covering All or a Portion of the Substrate with the Coating
400 Article of Manufacture
400a Article with Substrate, Coating, and Clear Coat
400b Article with Substrate, Light Influencing Layer, Coating, and Clear Coat
400c Article with Substrate, Coating, and Molded Surface
400d Article with Substrate, Light Influencing Layer, Coating, and Molded Surface
402 Substrate
404 Light Influencing Layer
406 Coating
408 Clear Coat
412 Molded Surface

What is claimed is:

1. An article of manufacture, comprising:
a substrate; and
a coating including a colorant covering all or a portion of the substrate, with the coating including a plurality of bubbles that create material voids in the coating, the plurality of bubbles limiting change in color by the colorant of any light transmitted through the article of manufacture,
wherein the material voids formed by the plurality of bubbles form about 50 percent or more by volume of the coating.

2. The article of manufacture of claim 1, wherein a refractive index of the substrate is greater than or equal to 1.25 and less than or equal to 1.75.

3. The article of manufacture of claim 1, wherein a cross-sectional thickness of each individual bubble of the plurality of bubbles is about 1 micrometer or less.

4. The article of manufacture of claim 1, further comprising:
a clear coat covering all or a portion of the coating, the clear coat filling in any surface irregularities created by the plurality of bubbles in the coating.

5. The article of manufacture of claim 1, wherein the article of manufacture forms part of a vehicle.

6. The article of manufacture of claim 1, wherein the plurality of bubbles is homogenously distributed throughout the volume of the coating.

7. The article of manufacture of claim 1, wherein the plurality of bubbles is non-homogenously distributed throughout the volume of the coating.

8. The article of manufacture of claim 1, further including a light influencing layer comprising a colorant, the light influencing layer biasing a color of a light to the color of the colorant.

9. The article of manufacture of claim 8, wherein the light influencing layer contains the plurality of bubbles.

10. A lighting system, comprising:
an article of manufacture, including:
a first side;
a second side; and
a plurality of bubbles contained within the article of manufacture; and
a light source positioned adjacent to the first side of the article of manufacture to direct light through the article of manufacture from the first side to the second side,
wherein a cross-sectional thickness of each individual bubble of the plurality of bubbles is about 1 micrometer or less.

11. The lighting system of claim 10, wherein the second side forms part of an exterior surface of a vehicle.

12. The lighting system of claim 10, wherein the second side forms part of an interior trim of a vehicle.

13. The lighting system of claim 10, wherein the article of manufacture includes a coating that contains the plurality of bubbles.

14. The lighting system of claim 13, wherein the article of manufacture includes a substrate and a light influencing layer, wherein the light influencing layer is located between the substrate and the coating.

15. A method of forming an article of manufacture, comprising:
forming a substrate having a predetermined shape;
covering all or a portion of the substrate with a coating; and
adding a foaming agent or injecting a gas into the substrate, the coating, or both when the substrate, the coating, or both are being formed so that the substrate, the coating, or both includes a plurality of bubbles, wherein the plurality of bubbles is homogenously distributed throughout a volume of the substrate, the coating, or both.

16. The method of claim 15, further comprising:
covering all or a portion of the coating with a clear coat, with the clear coat filling in any surface irregularities created by the plurality of bubbles in the coating.

17. The method of claim 15, wherein the foaming agent is a mixture of polyether polyol and poly-isocyanate.

18. The method of claim 15, wherein the article of manufacture is configured to form part of a vehicle.

19. The method of claim 15, further comprising:
covering the substrate with a light influencing layer first and then covering the light influencing layer with the coating.

20. The method of claim 15, further comprising:
applying a clear coat over the coating and the substrate.

* * * * *